April 23, 1963  H. M. FORMAN  3,086,448
TILTABLE COOKING UTENSIL

Filed July 8, 1960  2 Sheets-Sheet 1

Inventor:
Hugh M. Forman,
by His Attorney.

April 23, 1963 H. M. FORMAN 3,086,448
TILTABLE COOKING UTENSIL
Filed July 8, 1960 2 Sheets-Sheet 2
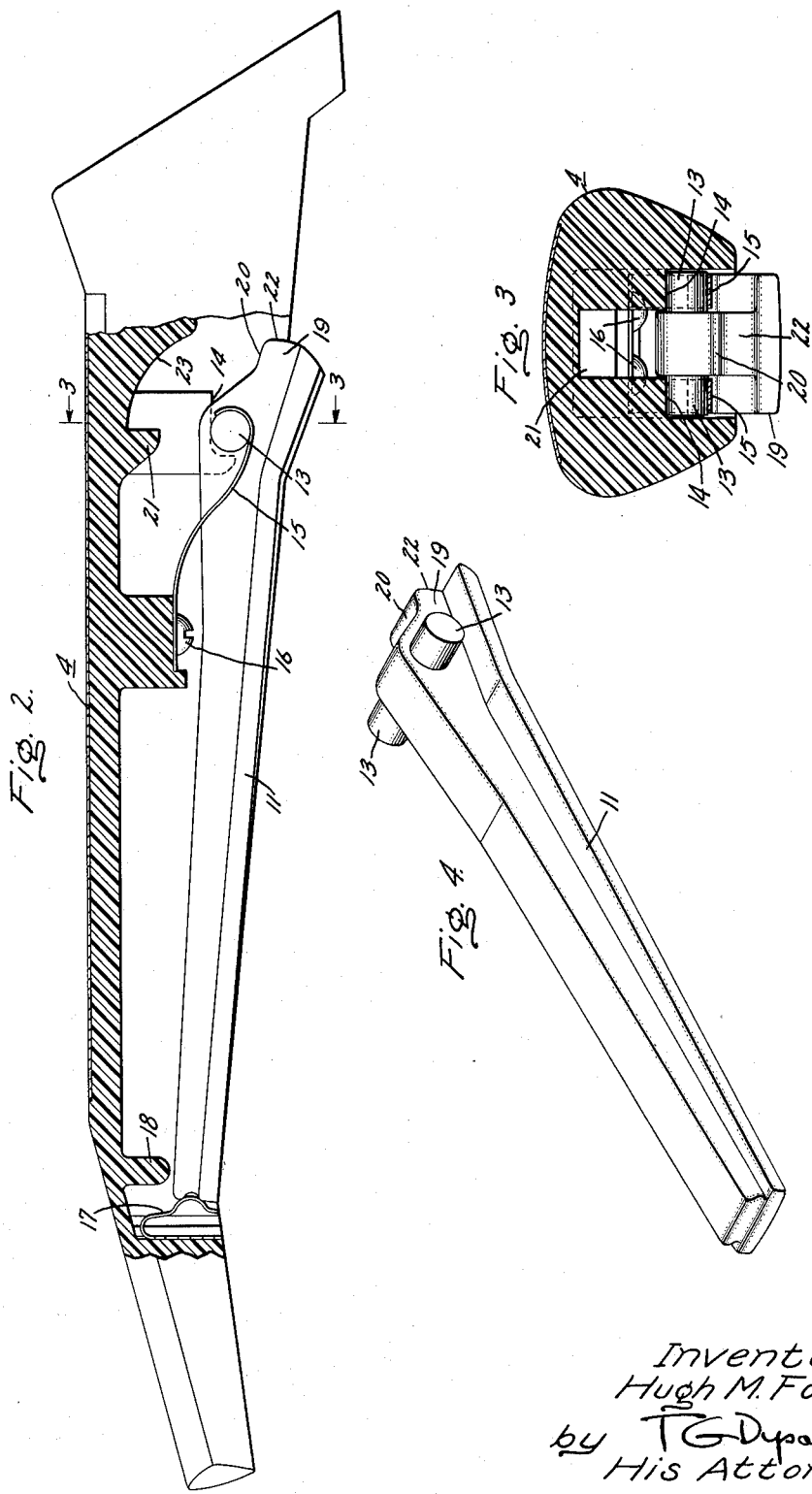
Inventor:
Hugh M. Forman,
by T G Dypart
His Attorney.

United States Patent Office 3,086,448
Patented Apr. 23, 1963

3,086,448
TILTABLE COOKING UTENSIL
Hugh M. Forman, Brockport, N.Y., assignor to General Electric Company, a corporation of New York
Filed July 8, 1960, Ser. No. 41,530
3 Claims. (Cl. 99—425)

This invention relates to cooking utensils of the type having a cooking surface for frying or griddling operations, such as electric skillet and the like.

When meat products such as bacon, sausage and chops are fried in a skillet a quantity of liquid fat is produced, and it is sometimes desirable to drain such fat from the meat as cooking proceeds. On the other hand, there are a number of skillet type cooking operations in which liquid fat, and other liquids, are added to or allowed to accumulate around the food being cooked. Thus there is a need for a cooking utensil adapted to perform both types of cooking operations.

The present invention has as its principal object the provision of an improved cooking utensil having easily operable means for supporting its cooking surface in either an inclined or a horizontal position, so that it is capable of performing both types of cooking operations described above.

Further objects and advantages of the invention will become apparent as the following description proceeds, and the features of novelty which characterize the invention will be pointed out with particularlity in the claims appended to and forming a part of this specification.

Briefly stated, in accordance with one aspect of this invention, I provide a cooking utensil having a normally horizontal cooking surface, a leg member pivotally mounted on the utensil for movement between a retracted position and a downwardly extending position in which it supports the cooking surface in an inclined position, and a lever member associated with the leg member so as to be movable upwardly by finger pressure and thus shift the leg member to its downwardly extending position.

For a better understanding of my invention, reference may be made to the following description and the accompanying drawings in which:

FIG. 2 is an enlarged view of the handle of the utensil shown in FIG. 1, some of the parts being broken away to show details of construction;

FIG. 3 is a cross-sectional view taken along the line 3—3 in FIG. 2, and

FIG. 4 is a perspective view of a portion of the structure shown in FIG. 2.

Figure 1:
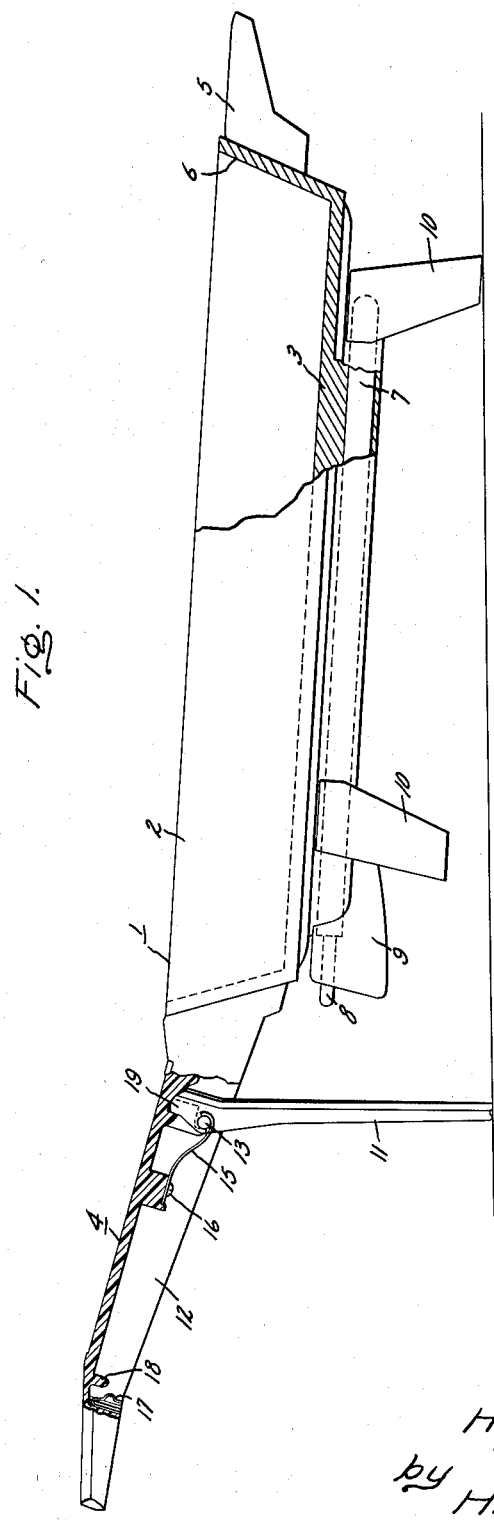
FIG. 1 is a side elevation view of a cooking utensil embodying the invention, some of the parts being broken away to show details of construction.

As shown in the drawings, may invention is incorporated in an electric skillet of the type having a built-in heating element and adapted to be controlled by a removable thermostatic control device such as that disclosed in Patent No. 3,007,029, granted on October 31, 1961 to Harvey Levine and assigned to the assignee of the present application.

Referring to the drawings, the numeral 1 designates an electric skillet including a body 2 having a normally horizontal bottom wall 3 forming a cooking surface, a laterally extending handle 4 and an additional handle 5. Body 2, which may be made of cast aluminum, is provided with a side wall 6 and as viewed from above its configuration is generally rectangular, although it will be understood that my invention may also be utilized in round cooking utensils. Handles 4 and 5, which are preferably made of a phenolic plastic material, are secured to opposite portions of side wall 6 by any suitable means, such as screws extending through portions of the handle and into threaded engagement with studs welded to side wall 6.

As shown in FIG. 1, heat for cooking operations is supplied to bottom wall 3 of the skillet by a tubular sheath type heating element 7, of looped configuration, cast into the bottom wall 3 and forming an integral part thereof. Heating unit 7 is provided with a pair of electrical terminal pins 8 which extend outwardly from body 2 and are positioned in laterally spaced relationship from handle 4. Terminal pins 8 are protected by a terminal shield 9 preferably made of plastic material and secured to the body 2, and it will be understood that the removable thermostatic control device disclosed in the aforementioned patent is arranged to be plugged into the terminals and be supported adjacent the terminal shield 9. Preferably the terminal portions of heating element 7 are sealed by means of the water-tight seal structure disclosed in Patent No. 2,963,569, granted December 6, 1960 to Harvey Levine and Otto F. Gerry, and assigned to the assignee of the present application. In this way the entire skillet shown in FIG. 1 may be immersed in water for washing purposes.

Skillet 1 is adapted to be used on counter tops and table top surfaces, being supported by a plurality of plastic feet 10, which are preferably four in number and which are mounted adjacent the four corners of body 2. In normal use, the skillet rests on legs 10, which are of equal height so that the cooking surface formed by bottom wall 3 is normally horizontal. In this position, skillet 1 is useful for cooking those foods which are best prepared with a quantity of liquid, such as fat or water, surrounding them. For example, stews, fried chicken, fried shrimp, and the like are ordinarily cooked in this manner.

In accordance with my invention, skillet 1 may also be used to cook food products such as bacon and chops which, in the opinion of many people, taste best when the fat they produce is continually drained away from the cooking surface. Thus, I provide a leg member 11 pivotally mounted on handle 4 for movement between a retracted position, as shown in FIG. 2, and a downwardly extending position generally perpendicular to the handle and to the cooking surface of the skillet, as shown in FIG. 1. Handle 4 is formed with a cavity 12 in the underside thereof within which leg member 11 is positioned when in its retracted position. As best shown in FIGS. 2 and 4, leg member 11 is provided with a pivot pin 13 which rests in a pair of downwardly extending concave bosses 14 within cavity 12 and which is held in place by a pair of leaf springs 15 secured to handle 4 by means of screws 16 for example.

When leg member 11 is in the retracted position shown in FIG. 2, its free end is supported in cavity 12 by means of a leaf spring latch member 17 provided with a convex surface engageable with the concave end portion of the leg member. In order to limit movement of leg member 11 into the cavity, a downwardly projecting stop member 18 is positioned therein adjacent end portion 16, so that the handle 4 may be firmly gripped by the user when the leg member is in its retracted position.

To facilitate manipulation of leg member 11 to its downwardly extending position, and also to provide means for limiting its pivotal movement so that it will remain in this position, I provide a lever member 19 formed integrally with leg member 11 adjacent the pivot axis of pivot pin 13. Lever member 19 extends from the pivotal axis of leg member 11 on the side opposite the leg member so as to rotate into cavity 12 and projects outwardly from the cavity when the parts are in the position shown in FIG. 2. Lever member 19 has an upper surface 20 arranged to engage a stop member 21 formed integrally with handle 4 when the leg member 11 is in the position shown in FIG. 1, and an end surface 22 which engages camming surface 23 on the handle as the leg member is moved toward the FIG. 1 position. End surface 22 on the lever member and camming surface 23 on the handle are formed and spaced in relation to pivot pin 13 so that the pivot pin is shifted downwardly, as viewed in FIG. 2, upon movement of leg member 11 to its downwardly extending position. The resulting increase in the biasing force of springs 15 on the pivot pin causes end surface 22 to press against camming surface 23 with sufficient force to maintain leg member 11 in its downward position.

In operation, when leg member 11 is in its retracted position as shown in FIG. 2, skillet 1 rests on all four of the legs 10, and the bottom wall 3 is in a generally horizontal position. When it is desired to fry foods on an inclined cooking surface, finger pressure is applied to the lower surface of lever 19 so as to disengage the free end portion of the leg member from latch 17, and the leg member is rotated to its downwardly extending position in which its upper surface 20 engages stop member 21, as shown in FIG. 1. In this position, fat produced during frying operations will drain toward the righthand portion of the skillet, as viewed in FIG. 1, and food products resting on the higher portions of wall member 3 will not become covered with fat as the cooking operation proceeds. To retract leg member 11, handle 4 is raised slightly and the leg member is then rotated about its pivot pin into engagement with latch 18.

While I have shown and described a particular embodiment of my invention, I do not desire the invention to be limited to the particular construction disclosed, and I intend by the appended claims to cover all modifications within the true spirit and scope of my invention.

What I claim is:

1. A cooking utensil comprising a body including a normally horizontal cooking surface, a laterally extending handle secured to said body, a downwardly extending boss on said handle, a leg member having a pivot pin adjacent one end thereof, spring means for holding said pivot pin in pivotal engagement with said boss, said leg being movable between a retracted position generally parallel to said handle and a downwardly extending position generally perpendicular thereto, the length of said leg member being such that said cooking surface rests in an inclined position when the utensil is on a level supporting surface and said leg is in its downwardly extending position, and a lever member secured in fixed relation with said leg member adjacent its pivotal axis, said lever member extending from said axis on the side opposite said leg member so as to rotate upwardly as said leg member is moved by finger pressure on said lever member from its retracted position toward its downwardly extending position, the length of said lever member being such that it contacts a portion of said handle and is held in frictional engagement therewith by said spring means when said leg is in its downwardly extending position.

2. A cooking utensil comprising a body having a normally horizontal cooking surface, a laterally extending handle secured to said body, said handle having an elongated cavity in the underside thereof and a downwardly extending boss in said cavity, a leg member having a pivot pin adjacent one end thereof, spring means for holding said pivot pin in pivotal engagement with said boss, said handle being movable between a retracted position within said cavity and a downwardly extending position generally perpendicular to said handle, the length of said leg member being such that said cooking surface rests in an inclined position when the utensil is on a level supporting surface and said leg member is in its downwardly extending position, a lever member formed integrally with said leg member adjacent its pivotal axis, said lever member extending from said axis on the side opposite said leg member so as to rotate into said cavity as said leg member is moved by finger pressure on said lever member from its retracted position toward its downwardly extending position, and a stop member in said cavity engageable with said lever member when said leg member is in its downwardly extending position, the length of said lever member being such that it contacts a portion of said handle and is held in frictional engagement therewith by said spring when said leg is in its downwardly extending position.

3. A cooking utensil comprising a body having a normally horizontal cooking surface, a laterally extending handle secured to said body, said handle having an elongated cavity in the underside thereof and a downwardly extending boss in said cavity, a leg member having a pivot pin adjacent one end thereof, spring means for holding said pivot pin in pivotal engagement with said boss, said handle being movable between a retracted position within said cavity and a downwardly extending position generally perpendicular to said handle, the length of said leg member being such that said cooking surface rests in an inclined position when the utensil is on a level supporting surface and said leg member is in its downwardly extending position, a latch mounted within said cavity and positioned so as to be in latching engagement with said leg member when the latter is in its retracted position, a lever member formed integrally with said leg member adjacent its pivotal axis, said lever member extending from said axis on the side opposite said leg member so as to rotate into said cavity as said leg member is moved by finger pressure on said lever member from its retracted position toward its downwardly extending position, and a stop member in said cavity engageable with said lever member when said leg member is in its downwardly extending position, the length of said lever member being such that it contacts a portion of said handle and is held in frictional engagement therewith by said spring when said leg is in its downwardly extending position.

References Cited in the file of this patent

UNITED STATES PATENTS 1,505,675     Stirn _____ Aug. 19, 1924

FOREIGN PATENTS 297,639     Great Britain _____ Sept. 27, 1928